May 26, 1931. R. J. BURROWS 1,807,379
DRAFT COUPLING FOR TRACTORS AND TRAILERS
Filed Sept. 17, 1926 2 Sheets-Sheet 1

Witnesses
Milton Lenoir
Elmer L. Zwickel

Inventor
Robert J. Burrows,
John L. Jackson.
By
Attorney

May 26, 1931.  R. J. BURROWS  1,807,379
DRAFT COUPLING FOR TRACTORS AND TRAILERS
Filed Sept. 17, 1926  2 Sheets-Sheet 2
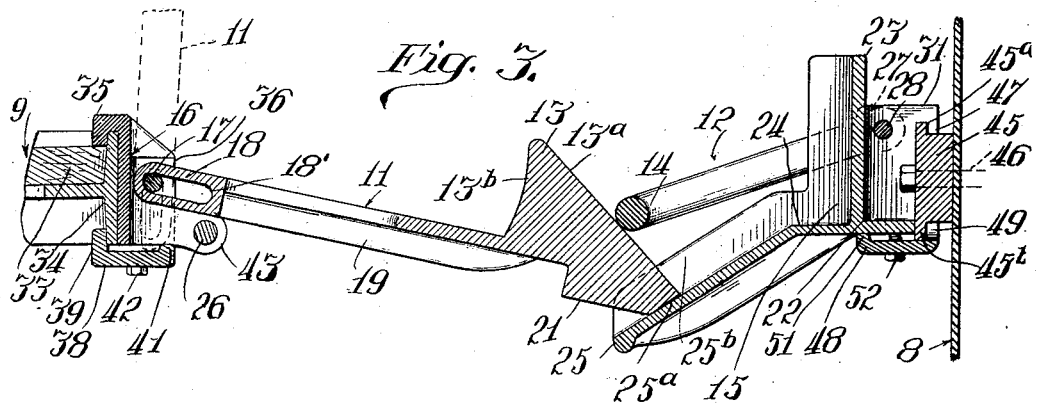
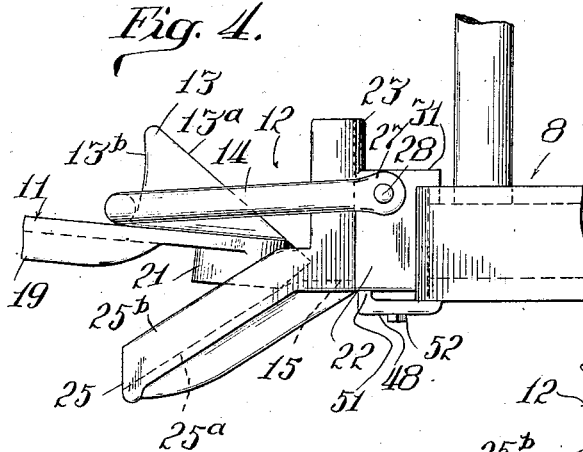
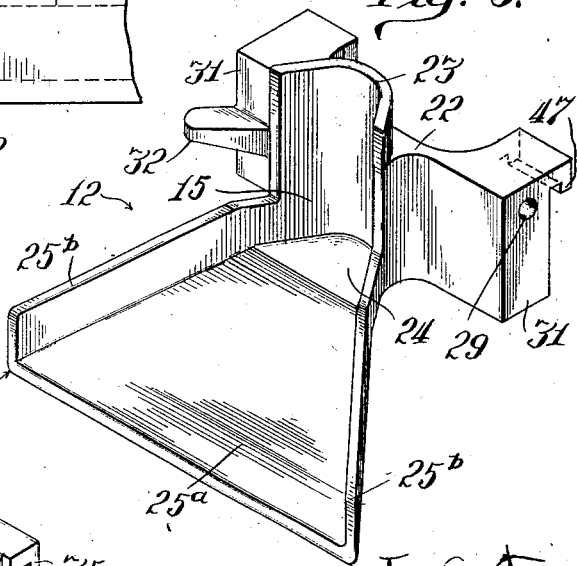
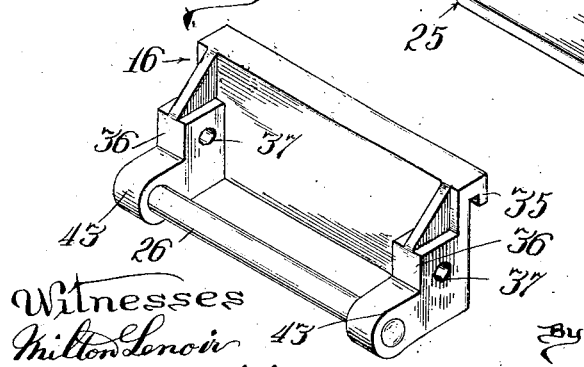
Inventor
Robert J. Burrows
John L. Jackson
By Attorney
Witnesses
Milton Lenoir
Elmer L. Zwickel Patented May 26, 1931

1,807,379

UNITED STATES PATENT OFFICE

ROBERT J. BURROWS, OF BUCHANAN, MICHIGAN, ASSIGNOR TO CLARK TRUCTRACTOR COMPANY, OF BUCHANAN, MICHIGAN, A CORPORATION OF MICHIGAN

DRAFT COUPLING FOR TRACTORS AND TRAILERS

Application filed September 17, 1926. Serial No. 136,025.

My invention has to do with coupling devices for coupling together a tractor and trailer, or a number of trailers in train formation, for hauling from place to place. Such trailers are commonly used on or about railway station platforms, warehouses, industrial plants, &c., for general hauling purposes.

One of the particular objects of the invention is to provide a draft coupling which will be operative to effect automatic coupling engagement between two vehicles of this type, whereby the tractor and trailer, or two trailers, can be coupled together by merely backing or pushing the ends of the two vehicles together. This automatic coupling feature is of manifest advantage as it enables the driver of the tractor to couple one or more trailers thereto without having to dismount from the tractor and manually complete such coupling operation each time that a trailer is to be coupled to the tractor, or to the end of the train of trailers.

A further object of the invention is to provide a coupling device which will effect such automatic coupling engagement even when the ends of the two vehicles are not alined end to end, but are disposed at a considerable angle to each other. This latter feature is also of decided advantage in the present adaptation of the invention owing to the fact that it is often times difficult to back a train of trailers into exact end-on alinement with another trailer which is to be coupled thereto.

A further object is to provide a coupling device which will effect such automatic coupling engagement even when the two vehicles are inclined at different vertical angles, as when one of the vehicles is disposed on a sloping surface or when both vehicles are on staggered levels.

Other objects of the invention are to provide an automatic coupling device which will permit of the two vehicles moving around a sharp turn or angle without binding of the coupler parts; which will permit of the vehicles inclining upwardly or downwardly relative to each other in traveling up and down sharp slopes, off and onto freight elevators, &c., without binding or jamming of the coupler parts; and which can be quickly uncoupled by merely raising one of the coupler parts.

Referring to the accompanying drawings, wherein I have illustrated a preferred embodiment of my invention:

Fig. 3 is a longitudinal sectional view of the device showing the draw bar in the act of entering the draw head;

Fig. 4 is a fragmentary side elevational view illustrating the draw bar in its coupled position in the draw head, and the draw head mounted on the end of a trailer;

Fig. 5 is a perspective view of the draw head, and

Fig. 6 is a perspective view of the mounting bracket of the draw bar.

Figure 1:
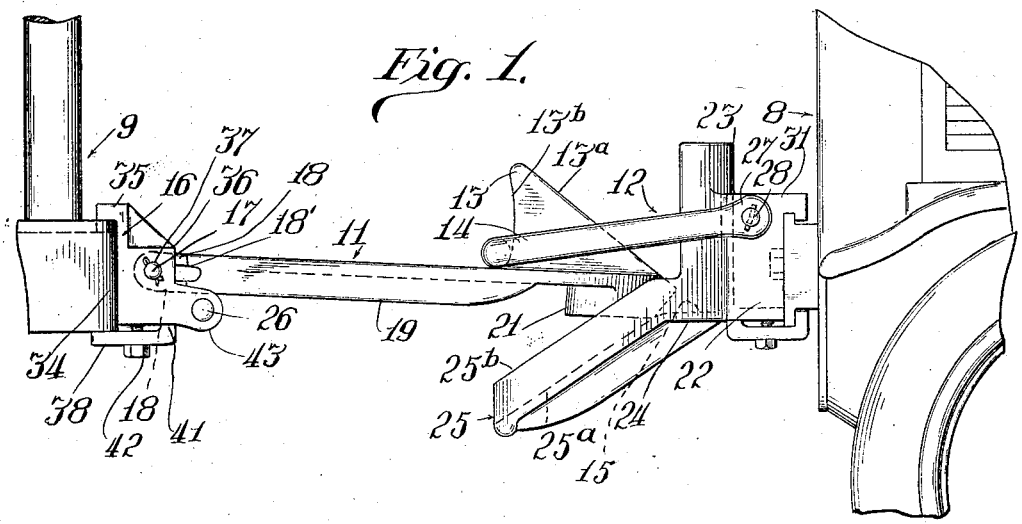
Fig. 1 is a side elevational view of the present coupling device, showing one of the coupler parts mounted on the draft end of a tractor, and the other coupling part mounted on the leading end of a trailer.

In Fig. 1 the draft end of a typical form of tractor is illustrated at 8, and one end of a conventional type of trailer is fragmentarily illustrated at 9. As I shall hereinafter describe, the bracket mounting parts for the two halves of the coupling are so constructed that they can be mounted interchangeably on the tractor or on either end of the trailer or trailers.

The two principal elements of the coupling are a vertically swinging draw bar 11 and a draw head 12. The draw bar 11 is provided with an upwardly extending hook 13 at its free end, and the draw head 12 comprises a coupling member 14 in the form of a U-shaped loop or eye which is pivotally supported on the draw head and which is adapted to drop down behind the hook 13 when the two elements of the coupling are brought together. The engagement of the loop or eye 14 over the hook 13 completes the coupling connection, the draft pull being transmitted through the loop 14 and hook 13 of the two coupler elements. The backing pressure incident to backing the trailer or train of trailers is transmitted through the engagement of the end of the draw bar in a socket 15 formed in the draw head, as I shall presently describe.

Figure 2:
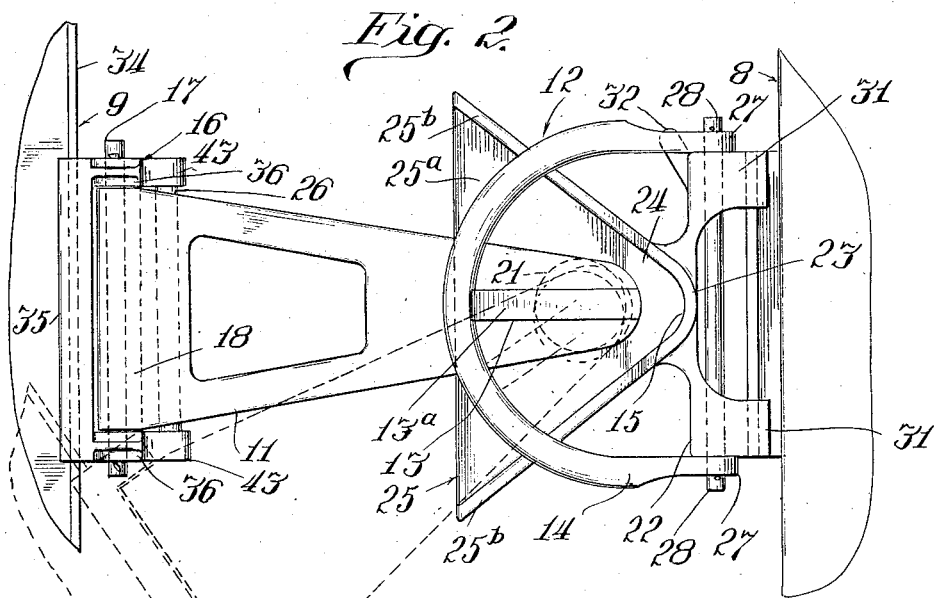
Fig. 2 is a plan view of the same, illustrating in dotted lines one angular position of the draw bar.

The draw bar 11 is supported on the end of the trailer (or tractor) through a mounting bracket 16, relative to which the draw bar has vertical swinging movement around a pivot pin 17 extending through a longitudinally slotted boss 18 formed on the bottom side of the draw bar. The slot 18' in this pivot boss enables the draw bar to be revolved upwardly and then dropped vertically down to bring the pin 17 into the upper end of the slot, whereby the draw bar will be held in an upright, out-of-the-way position when not in use, as illustrated in dotted lines in Fig. 3. Re-enforcing ribs 19 extend along the under side of the bar from the boss 18, these ribs terminating short of the free end of the bar. This latter end of the bar is formed with a downwardly extending boss 21, the forward, lower edge of which is beveled off to facilitate entrance of the draw bar into the socket 15 of the draw head. As viewed in plan in Fig. 2, the end of the bar and boss are given a rounded curvature for the same purpose. The hook 13 on the upper side of the bar has a long sloping cam surface 13$^a$ for automatically lifting the coupling loop 14 up over the hook, as the two coupler elements are being brought together. The relatively abrupt shoulder 13$^b$ forming the rear of the hook is preferably curved inwardly as shown to prevent any possibility of the coupling loop 14 working upwardly off the hook under draft load.

The draw head 12 comprises a bracket portion 22, substantially identical in all material respects to the mounting bracket 16 of the draw bar. In a later part of this description I shall describe the details of these mounting brackets and the manner of attaching the same to the tractor and trailers. The socket 15, which receives the end of the draw bar, is formed as an integral part of the bracket 22, being preferably located centrally thereof. The inner or back wall of this socket is curved to correspond substantially to the curvature of the end of the draw bar, and the socket is made relatively high by extending a semi-cylindrical flange 23 above the bracket portion 22. The top of the socket is open and the bottom is closed by a flat bottom wall 24.

For guiding the end of the draw bar under the U-shaped coupling link 14 and into the socket 15 in the automatic coupling of the device, a trough-shaped guide portion 25 is extended from the open side of the socket 15. This guide slopes downwardly and flares laterally, comprising the inclined bottom wall 25$^a$ leading downwardly from the bottom wall 24 of the socket and the diverging side walls or flanges 25$^b$ extending from the sides of the socket. It will be evident that as the two coupling elements are being brought together, this guide will accurately direct the movement of the draw bar into the socket part of the draw head, even though the two elements are considerably out of line either horizontally or vertically. If the draw bar is out of line horizontally with the draw head the lateral flanges 25$^b$ will deflect the draw bar up under the U-shaped coupling loop and into the socket. As will be observed from the dotted line position in Fig. 2, the coupling loop is free to drop down over the hook 13 and complete the coupled connection even though the two coupling elements are at a considerable lateral angle relative to each other. When the draw bar is uncoupled it is normally held at a slight downward inclination by a stop rod 26 carried by the mounting bracket, which stop rod is preferably so positioned that with both vehicles in the same horizontal plane the end of the draw bar will strike the sloping bottom wall of the guide approximately mid-way of the length thereof. If one of the vehicles is inclined vertically relative to the other, or if both vehicles are disposed on offset planes, it will merely result in the end of the draw bar engaging the sloping bottom wall of the guide 25 at either a higher or lower point, the draw bar being thereafter deflected up into the socket 15 as before.

The U-shaped coupling loop 14 has apertured pivot lugs 27 at its ends through which passes a horizontal pivot pin or shaft 28. This pivot pin also extends through holes 29 in laterally spaced flanges or blocks 31 formed as part of the bracket portion 22. A lug 32, formed integral with one of these blocks, projects diagonally outwardly therefrom and serves as a stop for limiting the downward swinging movement of the coupling loop. The large diameter of this loop affords a gradual curve within which the hook 13 of the draw bar can swing freely as the trailers travel around a corner or curve.

Each trailer will preferably be equipped at one end with a draw bar 11 and at the other end with a draw head 12, it being immaterial which of these coupler elements is mounted at the leading end and which at the trailing end of the vehicle. Similarly the hitch end of the tractor may be provided either with a draw bar or draw head, Fig. 1 illustrating it equipped with the latter. To the end of standardizing the equipment and making the two coupler elements interchangeably mountable on either end of each trailer it is desirable that the mounting brackets of both coupler elements be substantially the same. It is also desirable that this one type of mounting bracket be attachable to the tractor so as to avoid the necessity of special equipment.

To this end I have devised a clamping type of mounting bracket which I deem preferable because of its ready adaptability to certain standard trailer designs, but obviously this mounting bracket may be modified for attachment to other types of trailers. The conventional type of trailer to which I have reference has its platform surface 33 re-enforced and protected at its sides and ends by a metallic strap or bar 34 of horizontal T section, the flanges of which project above and below the platform, as best shown in Fig. 3. The projecting edges of this strap or bar serve as effective points of attachment to secure the present coupling parts to the trailers.

Referring first to the mounting bracket 16 of the draw bar 11, this bracket consists of a plate member having a hook-like flange 35 formed along its upper edge adapted to hook over the upper projecting edge of the re-enforcing bar 34. Projecting from the opposite side of this plate are two spaced flanges or blocks 36 having holes 37 therein through which pass the ends of the pivot pin 17 on which the draw bar is mounted. In clamping the lower part of the bracket to the bar 34, a clamping plate 38, having an upwardly turned flange 39, is secured to the under side of the bracket with the flange 39 hooking against the inner side of the re-enforcing bar 34. The opposite edge of such clamping plate is formed with a raised ridge or flange 41 which is adapted to bear against the under sides of the bracket flanges 36 adjacent the outer corners thereof. Cap screws or bolts 42 pass up through holes in this clamping plate and into tapped holes in the bracket flanges for drawing the clamping plate up against the bracket and against the under side of the trailer. In drawing up on this clamping plate through the cap screws 42 the plate will be caused to rock or pivot around its raised point 41, thereby forcing the other edge of the plate up into secure engagement with the bottom side of the trailer platform 25 or the lower edge of the re-enforcing bar 34. The stop rod 26 which limits the downward inclination of the draw bar extends transversely between two apertured bosses 43 projecting from the flanges or blocks 36 of the mounting bracket 16. This stop rod prevents the draw bar from dropping down to a point where it would not engage the guide 25 of the draw head in a coupling operation, and prevents it from dropping to a point where the slotted boss 18 might slide rearwardly and become interlocked with the upper edge of the bracket 16. When the draw bar has been revolved upwardly and dropped down relative to the pivot pin 17, as indicated in dotted lines in Fig. 3, it will be retained in this inoperative position by its engagement with the flat face of the mounting bracket above and below the pin 17.

As above remarked, the draw head 12 comprises a generally similar arrangement of clamping parts whereby it may effect the same attachment with the re-enforcing strap or bar 34 at the other end of the trailer, (see Fig. 4). In order that either coupler element may be mounted on the tractor without the necessity of a special coupler bracket, the tractor is provided with a hitch block 45 at its end which has the general formation of the end of the trailer. Such hitch block and the particular construction of the mounting bracket 22 are illustrated in Fig. 3. The hitch block is of horizontal T shape having a main body portion and upper and lower flanges 45a and 45b, corresponding to the platform and projecting strap edges of the trailer. This hitch block is suitably secured to the end of the tractor, as by bolts 46. The blocks or flanges 31 of the mounting bracket 22 bear against the outer face of the hitch block and hook-shaped flanges 47 on these blocks engage over the upwardly projecting flange 45a of the hitch block. The lower flange 45b of the hitch block is adapted to be engaged by a clamping plate 48 which is attached to the bottom of the draw head. Such clamping plate has an upwardly extending flange 49 adapted to hook in back of the lower flange 45b of the hitch block, and also has an upwardly extending ridge or flange 51 adapted to bear against the bottom of the draw head. Cap screws or bolts 52 passing up through the clamping plate 48 and tapping into the bracket portions 31 serve to clamp the plate 48 in rigid engagement with the hitch block. It will be observed that this clamping type of mounting bracket is generally similar to the mounting bracket 16, so that it can be secured to the trailers as well, as shown in Fig. 4.

In the operation of the coupling device, the guide 25 will properly direct the draw bar up into the draw head with the vehicles moving together at a considerable lateral or vertical angle to each other. There is thus no necessity of alining the vehicles before coupling and such coupling is effected automatically. In the draft of the vehicles, each trailing vehicle is free to swing sharply to either side in turning a corner without restraint from the coupling, the hook 13 swiveling around to any point in the coupling loop 14. In such lateral swinging of the coupler parts, the boss 21 will hold the draw bar sufficiently high so that its lateral edges will not strike the flaring side flanges 25b of the guide 25. The termination of the re-enforcing flanges 19 of the draw bar short of the cylindrical boss 21 also assists in this. In traveling up and down slopes and over obstructions the draw bar will merely swing up and down around its pivotal mounting, remaining in coupled engagement, however, with the coupling loop which will also swing up and down to remain in engagement with the draw bar hook under the action of gravity. In backing the vehicles, the rounded end of the draw bar will move into the rounded socket 15, whereby a direct backing thrust can be transmitted through the coupling. This socket engagement will prevent any possibility of the end of the draw bar slipping laterally in the draw head, which would interfere with the accurate backing of the vehicles. The considerable height of the socket avoids any possibility of the draw bar slipping out of the top of the socket in backing or in bringing the coupling elements together. To release the coupling it is merely necessary to lift the coupling loop and push the vehicles apart.

While I have shown what I consider to be a preferred embodiment of my invention, it will of course be understood that such embodiment is merely exemplary of the essence of the invention and that proportions and the arrangement of the parts can be varied considerably without departing therefrom.

What I claim as my invention and desire to secure by Letters Patent, is—

1. A coupling device for tractors and trailers comprising a mounting bracket, a pivot pin carried by said bracket, a vertically swinging draw bar having a slotted end portion engaging over said pin, stop means for limiting the downward swinging movement of said draw bar, a hook on the swinging end of said draw bar, a draw head comprising guide means for guiding said draw bar both laterally and vertically into coupling engagement with said draw head, and a vertically swinging coupling member carried by said draw head and adapted to be cammed upwardly by said draw bar for dropping down over said hook, said hook having lateral swinging movement in said coupling member.

2. A coupling device for vehicles comprising a vertically swinging draw bar having a hook on its upper side, means detachably mounting said draw bar on one of said vehicles, a draw head comprising guide means for guiding said draw bar both laterally and vertically into coupling engagement with said draw head, and means comprising a single U-shaped member adapted to engage said hook for automatically coupling said draw bar to said draw head.

3. A coupling device comprising a vertically swinging draw bar having a hook on its upper side, a draw head comprising guide means for guiding said draw bar both laterally and vertically into coupling engagement with said draw head, and a gravity operated U-shaped coupling loop pivotally supported on said draw head and adapted to fall over said hook, said draw head being open at the upper portion so that said bar and loop when in coupled engagement may swing upwardly, relative to said draw head, a substantial amount.

4. A coupling device comprising a vertically swinging draw bar having an upwardly extending triangular projection on its swinging end, said triangular projection having an upper cam surface thereon, a lower cam surface at the end of the swinging bar intersecting the upper cam surface of the triangular projection and disposed at an angle thereto, a draw head comprising guide means depending therefrom for receiving the swinging end of the draw bar, a pivoted ring disposed above said guide means, and stop means for limiting the downward swinging movement of said ring, said lower cam surface being adapted to coact with said guide means to raise said draw bar relatively to said draw head and said upper cam surface being adapted to raise said ring in the initial part of the coupling operation, continued motion of either the draw bar or draw head permitting said pivoted ring to drop by gravity behind the triangular projection on the end of said draw bar, thereby completing a draft connection between the said draw bar and the draw head.

5. A coupling device for tractors and trailers comprising a mounting bracket, a pivot pin carried by said bracket, a vertically swinging draw bar having a slotted end portion engaging over said pin, stop means for limiting the downward movement of said draw bar, a triangular projection extending upward at the end of said swinging bar having a cam surface thereon, a downwardly extending boss at the end of said swinging bar disposed beneath said triangular projection, said downwardly extending boss having a cam surface thereon intersecting the cam surface of the triangular projection and disposed at an angle thereto, a draw head having guide means depending downwardly and outwardly therefrom adapted to engage the end of said swinging bar, said guide means having upturned edges thereon, a pivoted ring disposed above said guide means and overhanging the same, said draw bar on engaging said draw head contacting the guide means and pivoted ring, with the cam surfaces on said boss and triangular projection respectively causing the draw bar to be guided upwardly on the guide means between the upturned edges thereon, thereby raising said pivoted ring until it drops behind the triangular projection on said swinging draw bar and completing a draft connection between the said draw bar and the draw head.

6. A coupling device for tractors and trailers comprising a vertically swinging draft bar having a hook on its upper side adjacent to the swinging end thereof, a draw head comprising a socket portion, a trough-shaped guide extending therefrom having an inclined bottom wall leading downwardly from said socket portion, and side walls converging towards said socket portion for directing said draft bar into said socket portion in the act of coupling, and a vertically swinging bail-shaped coupling member pivotally mounted on said draw head and adapted to drop behind said hook when the end of said draft bar is moved into said socket portion, the side walls of said trough-shaped guide terminating below the plane of said draft bar so that when the draft bar is coupled in said socket portion it is free to swing horizontally to angular positions above said side walls.

7. A coupling device comprising a relatively short pivoted bar having a hook on its upper side, means pivoting said bar for vertical swinging, a draw head adapted to receive said bar, a gravity operated coupling member pivotally mounted on said draw head and adapted to engage said hook, and means on the draw head to engage the bar and guide the same into engagement with said coupling member.

8. A coupling device for tractors and trailers comprising a mounting bracket, a vertically swinging draw bar, means pivotally connecting said bar and bracket, stop means for limiting the downward swinging movement of said draw bar, a hook on the swinging end of said draw bar, a draw head comprising guide means for guiding said draw bar both laterally and vertically into coupling engagement with said draw head, and a vertically swinging coupling member carried by said draw head and adapted to be cammed upwardly by said draw bar for dropping down over said hook.

9. A coupling device for vehicles comprising a mounting bracket, means for detachably connecting said bracket to one of the vehicles, a vertically swinging draw bar having a hook at the outer end thereof, means pivotally connecting said bar and bracket, a second mounting bracket, means for detachably connecting said second mounting bracket to the other vehicle, a draw head formed on said second bracket and having means for guiding said draw bar into said draw head, and a vertically swinging coupling member carried by said draw head and adapted to be engaged over said hook in traction transmitting relation therewith.

10. A coupling device for vehicles comprising a vertically swinging draw bar having a hook on its upper side, and a guiding surface on its lower side, means detachably mounting said draw bar on one of said vehicles, a draw head comprising guide means for guiding said draw bar both laterally and vertically into coupling engagement with said draw head, said guide means cooperating with the guiding surface on the lower side of said draw bar, and means comprising a single U-shaped member adapted to engage said hook for automatically coupling said draw bar to said draw head.

11. A coupling device comprising a relatively short vertically swinging draw bar having a hook on its upper side, a draw head adapted to receive said bar, said bar being adapted to have a limited lateral swinging movement, means on the draw head to guide the draw bar vertically to automatically engage the same with the coupling member, and a coupling member pivotally carried by said draw head and adapted to fall from the force of gravity over said hook.

ROBERT J. BURROWS.